United States Patent
Bohner et al.

[19]
[11] Patent Number: 5,803,202
[45] Date of Patent: Sep. 8, 1998

[54] REACTION SIMULATOR ESPECIALLY FOR A VEHICLE STEERING SYSTEM

[75] Inventors: Hubert Bohner, Böblingen; Martin Moser, Fellbach; Karsten Gerdes, Kürten, all of Germany

[73] Assignee: Mercedes-Benz AG, Stuttgart, Germany

[21] Appl. No.: 731,761

[22] Filed: Oct. 18, 1996

[30]     Foreign Application Priority Data

Oct. 20, 1995 [DE] Germany .................. 195 39 101.2

[51] Int. Cl.⁶ .................................................. B62D 5/04
[52] U.S. Cl. ...................... 180/443; 180/446; 180/402
[58] Field of Search .................................. 180/402, 421, 180/443, 446, 403

[56]              References Cited

U.S. PATENT DOCUMENTS

| | | |
|---|---|---|
| 4,676,331 | 6/1987 | Iwaki et al. ........................ 180/443 |
| 4,771,846 | 9/1988 | Venable et al. . | |
| 4,860,844 | 8/1989 | O'Neil ............................ 180/402 |
| 5,097,917 | 3/1992 | Serizawa et al. ..................... 180/402 |
| 5,247,441 | 9/1993 | Serizawa et al. . | |

FOREIGN PATENT DOCUMENTS

| | | |
|---|---|---|
| 0 447 626 | 9/1991 | European Pat. Off. . |
| 0 556 082 | 8/1993 | European Pat. Off. . |
| 1 132 497 | 2/1965 | United Kingdom . |
| WO 90/12724 | 11/1990 | WIPO . |

*Primary Examiner*—Anne Marie Boehler
*Assistant Examiner*—Michael Cuff
*Attorney, Agent, or Firm*—Klaus J. Bach

[57]                ABSTRACT

In a reaction simulator for a control system, particularly a vehicle steering system, including a control handle, particularly a steering wheel, for providing a master set point value for a slave control structure, particularly the operating mechanism of a vehicle steering system, the reaction simulator comprises a return spring arrangement biasing the handle into a rest position and force generating means for applying forces to the handle for simulating direct coupling of the handle and the slave control structure.

5 Claims, 3 Drawing Sheets

REACTION SIMULATOR ESPECIALLY FOR A VEHICLE STEERING SYSTEM

BACKGROUND OF THE INVENTION

The invention relates to a reaction simulator for a control arrangement particular a motor vehicle steering system comprising a control device, particularly a steering wheel, for providing a set point value and a control structure adjustable to the particular set point value by a controller wherein a force is applied by the reaction simulator to the control device which simulates firm coupling between the control device and the control structure.

Control arrangements in which an arbitrarily operable operator is connected to a control structure without any mechanical or hydraulic coupling, that is simply by signal exchange, are basically known. Such control arrangements are also called "Steer by Wire" systems. For example, the tail and wing flaps of commercial and military airplanes are operated in this manner. With today's control mechanisms signal transmission is possible with greatest reliability so that corresponding control arrangements are utilized even in passenger planes.

Consequently, it is certainly possible to design the steering for an arbitrarily steerable vehicle in such a way that the steering wheel is, at least under normal conditions, neither mechanically nor otherwise directly coupled with the wheels.

However, in order to give the driver still the steering feel of conventional vehicle steering systems the steering wheel must be provided with a reaction simulator which, depending on the particular operating conditions, applies forces to the steering wheel which are at least similar to those effective on the steering wheel when there is a firm connection between the steering wheel and the steered wheels and which are noticeable by the hands of the vehicle operator.

In this connection, it is known from U.S. Pat. No. 4,771, 846 to operatively connect an electromagnetically controllable brake to the steering wheel such that a steering resistance can be made noticeable at the steering wheel which depends on particular vehicle operating conditions.

In accordance with EP 04 47 626 A2 a steering wheel is operatively connected to an electric motor which offers the possibility to generate a steering resistance and also to simulate steering wheel movements as they are generated by conventional steering systems by road bumps for example.

WO90/12724 and EP 05 56 082 A1 disclose the use of fluid operated motors in place of an electromotor for simulating reaction forces on the steering wheel.

However, with all these arrangements the operating reliability of the reaction simulators still appears to require improvement.

It is therefore the object of the present invention to provide a new concept for a reaction force simulator.

SUMMARY OF THE INVENTION

In a reaction simulator for a control system, particularly a vehicle steering system, including a control handle, particularly a steering wheel, for providing a master set point value for a slave control structure, particularly the operating mechanism of a vehicle steering system, the reaction simulator comprises a return spring arrangement biasing the handle into a rest position and force generating means for applying forces to the handle for simulating direct coupling of the handle and the slave control structure.

The invention is based on the general idea to provide the basic characteristics for the reaction force simulation by a return spring arrangement which is practically 100% reliable. For a motor vehicle steering system such an arrangement should provide a return spring arrangement whereby the forces applied thereby to the steering wheel are essentially the same as those acting on the steering wheels with conventional vehicle steering systems at higher vehicle speeds. At higher vehicle speeds the hysteresis effects occurring in normal vehicle steering systems by friction are relatively small that is the steering return force noticeable at the steering wheel is only little less than the steering resistance which is effective when the steering wheel is turned from straight forward to the right or to the left.

That is the effect of the force generating arrangement is superimposed on the effect of the spring return arrangement in such a way that, upon failure of the force generating arrangement, there is still a simulated return force effective on the steering wheel which corresponds to the conditions of a conventional steering system at high vehicle speeds so that the driver cannot be surprised in a dangerous manner when the force generator should fail for some reason.

In a particularly preferred embodiment of the invention the return spring arrangement applies the return spring forces to the controller (steering wheel) and also to a hydraulic unit which when subjected to pressure seeks to reduce the force which is applied by the return spring arrangement to the controller. Furthermore, the controller is directly connected to an electric motor by which movements of the controller can be generated.

The invention will be described in greater detail below on the basis of the accompanying drawings.

DESCRIPTION OF A PREFERRED EMBODIMENT

Figure 1A:
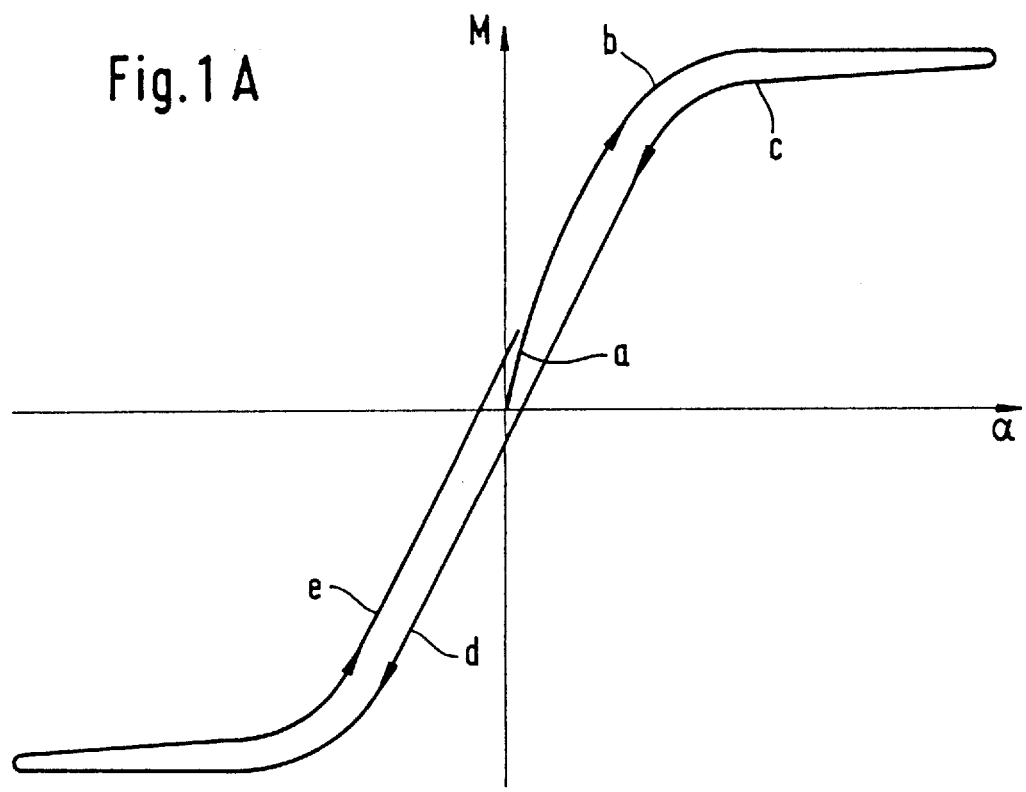
FIGS. 1A and 1B show diagrams representing the typical forces necessary to operate conventional steering wheels.

FIG. 1A shows the manually applied moments required to operate a steering wheel at high vehicle speeds when the steering wheel is turned from a straight forward position by an angle α, the steering wheel being turned first in one direction to its end position and then in the opposite direction up to the other end position and so on. In accordance with a curve a, a certain minimum force is required to move the steering wheel out of its straight forward position. With further rotation of the steering wheel, first a continuously increasing moment has to be overcome as indicated by the curve b. When a limit moment Mg has been reached the force for further turning the steering wheel remains essentially constant that is, the steering wheel can be further turned against an essentially constant counter moment until the end position is reached. The effective return moment is somewhat smaller, because of internal friction in the steering mechanism, than the moment needed to turn the steering wheel outwardly as indicated by curve c. However, the difference is relatively small since, at high vehicle speeds, the road surfaces provide little resistance to the steering movements of the wheels. Consequently, the return movement can easily return the steering system to a straight forward position when the steering wheel is released at higher speeds.

If the steering wheel is subsequently turned into the opposite direction, a corresponding counter moment is again generated as indicated by curve d whereas the return moment is again somewhat smaller than the counter moment as indicated by curve c.

The hysteresis between counter and return moments which results from friction is relatively small.

Figure 1B:
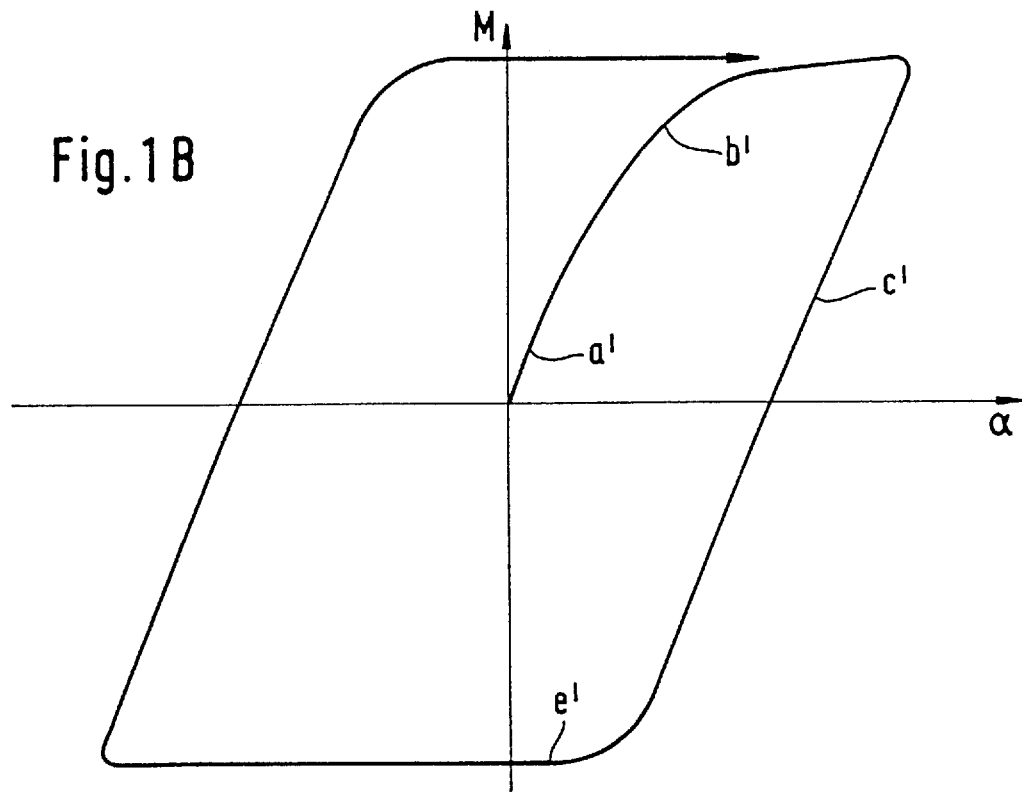

The situation however is completely different when the vehicle is at a standstill or is moving only very slowly. This situation is represented by FIG. 1B.

Whereas during operation of the steering wheel in accordance with the curves a' and b', there are essentially similar conditions as with the curves a and b of FIG. 1A, the return moment is quite different from the counter moment. In accordance with curve c', there is only little return movement of the steering wheel when the steering wheel is released. Then the steering wheel must be actively operated in accordance with the curve e'. Corresponding conditions apply for turning the steering wheel in the opposite direction.

It is the object for the reaction simulator according to the invention to provide for a similar action on a steering wheel which is not subject to forces imparted by the steering mechanism.

In a first embodiment of the reaction simulator according to the invention, a steering wheel 1 is operatively connected to a shaft 3 by way of a limited rotationally elastic hub 2. The shaft 3 coupled with a freely movable electric motor 4 by way of a transmission (not shown) is operatively connected to a carrier member 5 which is supported slidably in a direction transverse to the shaft 3. In this manner, a certain selectable counter-moment can be applied to the shaft in opposition to the turning of the steering wheel 1 depending on the energization of the electric motor. It is furthermore possible to generate, by appropriate energization of the electric motor 4, rotational movement of the steering wheel so as if the road surfaces generated a steering wheel reaction by way of the vehicle wheels which are not shown.

Figure 2:
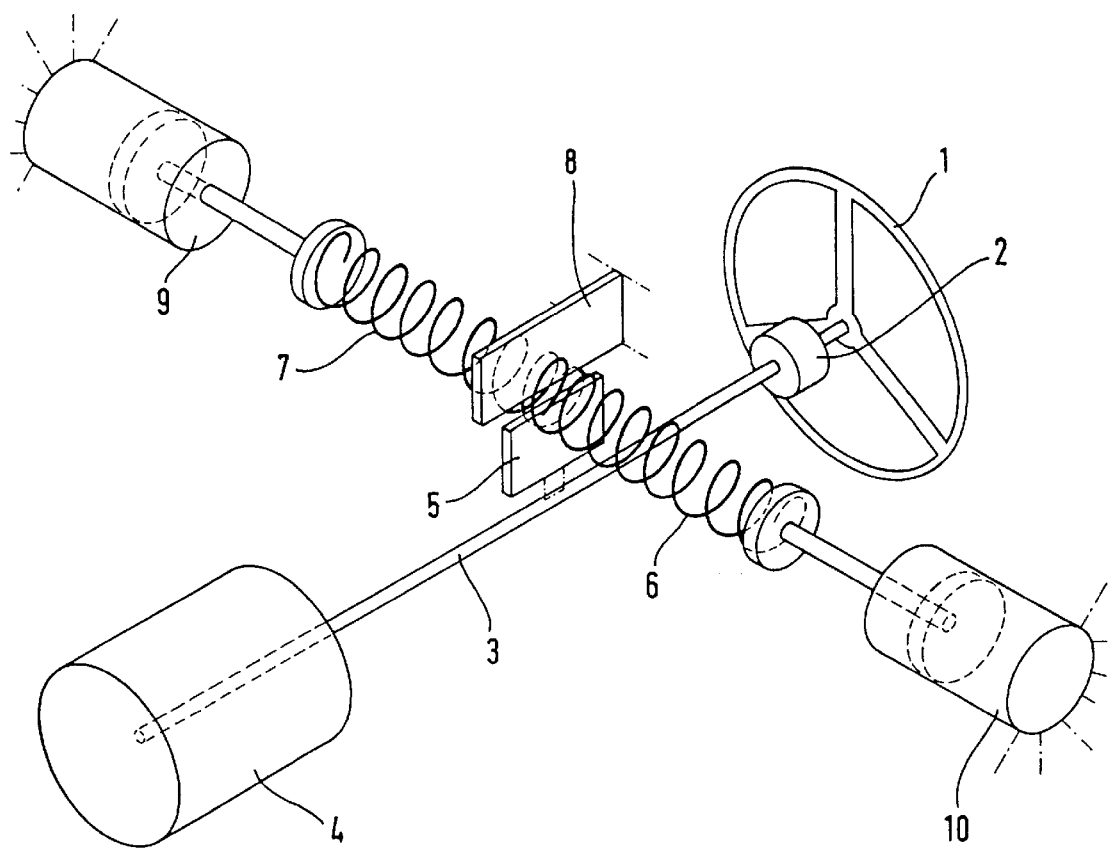
FIG. 2 shows schematically a first embodiment of a reaction force simulator according to the invention.

The carrier member 5 is moved to the right or to the left depending on the direction of rotation of the steering wheel. If a force is applied to the carrier member 5 in one or the opposite direction of movement thereof, it applies corresponding forces to the shaft 3 trying to rotate the steering wheel in one or the opposite direction. As shown in FIG. 2, the carrier member 5 is disposed in a center position where the carrier member 5 is engaged at opposite sides by two compression coil springs 6 and 7 which, in the center position as shown in FIG. 2, also engage a stationary stop member 8. At their opposite ends, the compression coil springs 6 and 7 are supported by hydraulically position adjustable support structures 9 and 10.

Whenever the steering wheel is turned out of its center position the carrier member 5 takes along the adjacent end of the spring toward which the carrier member moves, for example, the spring 6, so that the adjacent end of the spring 6 is increasingly distanced from the stop member 8 and is increasingly tensioned. The other coil spring 7 remains in engagement with the stop member 8.

The spring 6 accordingly provides a resistance force against the turning of the steering wheel which force increases with the spring compression. If appropriate, this force can be changed by changing the position of the support structure 10. The support structure position can be so adjusted that the return moment effective on the steering wheel 1 is smaller than the moment that was required to turn the steering wheel in the opposite direction by a selectable variable amount.

The corresponding measures apply when the steering wheel is turned in the opposite direction. In that case, the support bearing 9 is adjusted as necessary.

By changing the positions of the support structures 9 and 10, the speed-dependent hysteresis between counter moment and return moment of the steering wheel as shown in FIG. 1 can be simulated in a quite accurate manner.

The electric motor 4 mainly serves to simulate forces which are generated by road surface influences and are transmitted to the steering wheel of conventional steering systems.

In principle, however, it is also possible to use the electric motor 4 to simulate the hysteresis of FIGS. 1A and 1B by energizing the motor in such a way that it counteracts the return forces of the springs 6 and 7.

The rotationally elastic hub 2 simulates, under all conditions, the elasticity of the power transmission components between the steering wheel and the steered wheels present in conventional steering systems. Generally, rotational movement of the shaft 3 is transmitted to a position value sensor transmitter (not shown) and, by way of a control circuit, the steered wheels of the vehicle are operated by a servo unit to follow the rotation of the steering wheel 1 essentially without delay.

Figure 3:
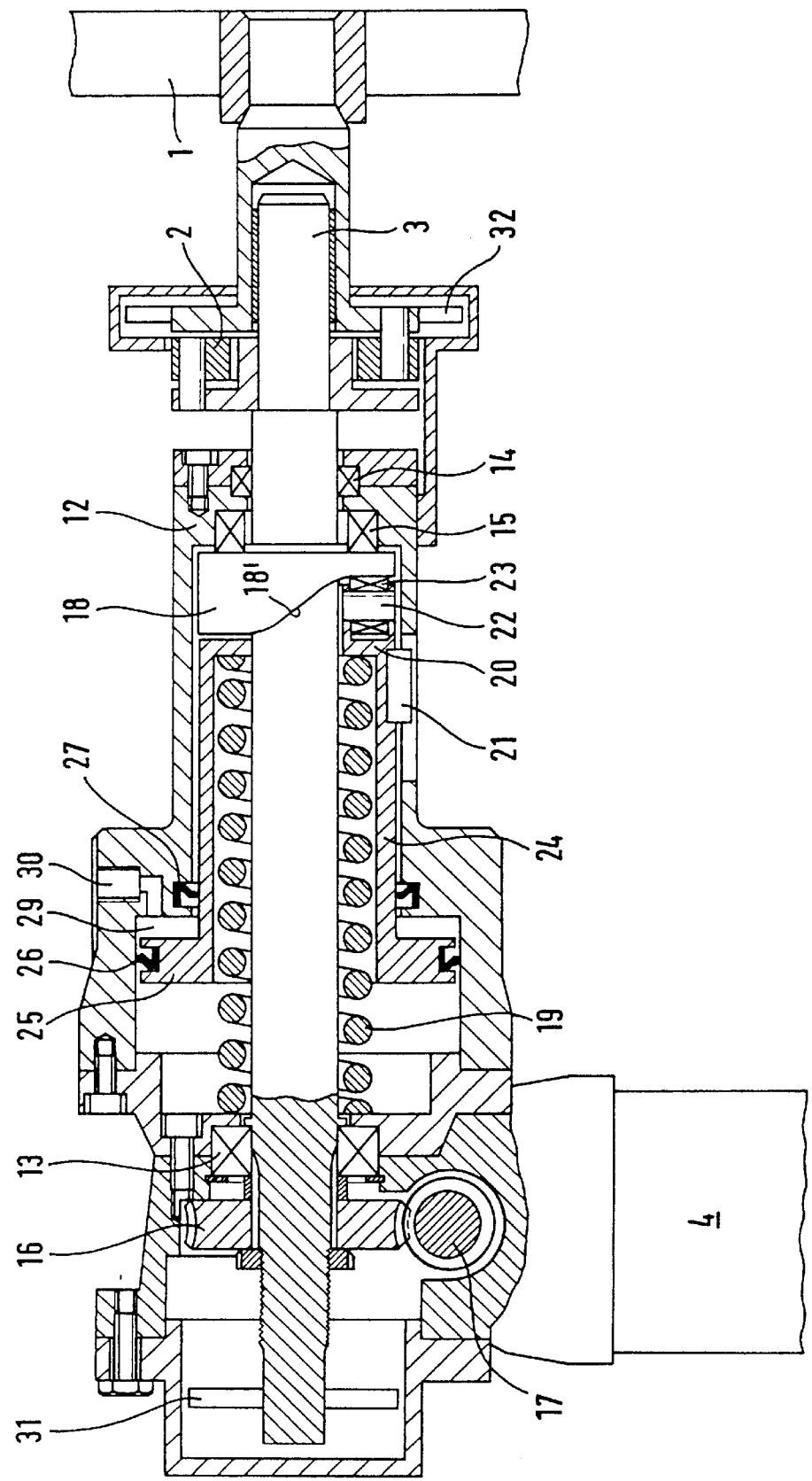
FIG. 3 shows a preferred embodiment of the invention.

As shown in FIG. 3, the steering wheel 1 is operatively connected to the shaft 3 by way of a rotationally elastic hub 2. The shaft 3 is rotationally supported in a housing 12 by a number of bearings 13, 14, 15 of which bearing 14 is a radial bearing and bearing 15 is an axial thrust bearing. The shaft 3 has a gear 16 mounted thereon which is in engagement with a worm gear 17 in a non-locking arrangement. The worm gear 17 is operatively connected to the electric motor 4 by way of an electrically operated clutch.

The shaft 3 is further provided with a cam cylinder 18 which is provided with two cam surfaces 18' arranged at opposite sides of a plane receiving the axis of the shaft 3. The two cam surfaces 18' have the same slopes which are however, oriented in opposite directions.

Within the housing 12, there is a compression coil spring 19 arranged concentrically with the shaft 3. At its left side end as shown in FIG. 3, the spring 19 is supported on a radial housing wall whereas the opposite right side end of the spring 19 engages an end wall 20 of a cylinder 24 and forces it into engagement with the cam cylinder 18. The cylinder 24 is axially movably supported in the housing 12, but rotation is prevented by a key 21 mounted on the cylinder 24 and being guided in a longitudinal slot formed in the housing 12. Adjacent the cam cylinder 18, the end wall 20 carries a needle bearing 23 mounted on a bolt 22 extending from the end wall 20 in a direction normal to the axis of the shaft 3 so that the needle bearing 23 can roll along the cam surfaces 18' when the shaft 3 is rotated. Consequently, upon rotation of the shaft 3, the needle bearing 23 is pushed back from the position as shown in FIG. 3 against the force of the compression coil spring 19 whereby a counter moment is applied to the shaft 3 when the shaft 3 and, together therewith, the cam cylinder 18 are rotated out of the center position shown in FIG. 3.

The end wall 20 is disposed at one end of the cylinder 24 whose other end forms an annular piston 25. The annular piston 25 is provided with an annular seal 26 and another annular seal 27 is disposed in the housing 12 and surrounds the cylinder 24 so as to define between the housing 12, the annular piston 25, the cylinder 24 and the annular seal 27, a sealed annular space 29 to which a fluid under pressure can be supplied by way of a passage 30 in the housing 12. The hydraulic pressure in the annular space 29 acts in opposition to the force of the spring 19, that is, it permits controlling the pressure applied by the spring to the cam cylinder 18. With sufficient fluid pressure, the needle bearing 23 can even be lifted off the cam cylinder surface 18' so that no return force simulation is provided by the spring 19.

The engagement force of the needle bearing 23 with the cam cylinder 18 and cam 18' of the shape of the cam cylinder 18 determine the moment which acts in opposition to the rotation of the steering wheel 1 and, consequently, the shaft 3. At the same time, the arrangement determines the return moment which seeks to return the steering wheel 1 to the center position shown in FIG. 3 when the steering wheel is turned out of its center position. By an appropriate pressurization of the annular space 29, the hysteresis of FIG. 1 can be accurately simulated. Essentially the same can be achieved by appropriate energization of the electric motor 29. In addition, the electric motor 4 can provide for rotational movement of the shaft 4.

In order to permit a very sensitive control of the moments noticeable at the steering wheel 1, angular position sensors 31 and 32 are provided at opposite sides of the rotationally elastic hub 2 so that the relative movement between the shaft 3 and the steering wheel 1 and accordingly the torque which is effective between the steering wheel 1 and the shaft 3 and which can be noticed at the steering wheel 1 can be determined. This permits controlling the moments noticeable at the steering wheel by application of fluid under pressure to the annular space 29 and/or by corresponding energization of the electric motor 4.

What is claimed is:

1. A reaction simulator for a vehicle steering system including: a steering wheel mounted on a shaft rotatably supported in a housing for providing a master set point value for an operating mechanism of a vehicle steering system, a cam cylinder mounted on said rotatable shaft for rotation therewith, a return spring with a force transmitting structure arranged so as to be biased by said spring into engagement with said cam cylinder for biasing said steering wheel into a rest position and to provide varying reaction forces to said steering wheel via said cam cylinder, and means for applying a controllable force to said force transmitting structure in opposition to the force applied by said spring for controlling the force applied to said cam cylinder for simulating direct coupling of said steering wheel with the operating mechanism of the vehicle steering system.

2. A reaction simulator according to claim 1, wherein said steering wheel is operatively connected, by way of an elastic coupling, to a motion transmitting means to which reaction simulating forces can be applied.

3. A reaction simulator according to claim 1, wherein said cam cylinder includes an axial cam structure and said force transmitting structure is a piston axially movably disposed in said housing and having a bearing disposed on said cam structure such that said piston is moved axially when said steering wheel is rotated, said spring biasing said cylinder toward, and said bearing into engagement with, said cam structure.

4. A reaction simulator according to claim 3, wherein said piston defines in said housing a cylinder chamber and means are provided for admitting fluid under pressure to said cylinder chamber so as to act on said piston for applying thereto said controllable force in opposition to the force applied by said spring to said cam cylinder.

5. A reaction simulator according to claim 4, wherein said steering wheel is coupled to said rotatable shaft by way of an elastic hub and angular position sensors are provided at opposite sides of said elastic hub so that relative movement between said rotatable shaft and said steering wheel, and accordingly the torque which is transmitted through said hub and which can be noticed at the steering wheel, can be determined and controlled by the pressure of the fluid supplied to said cylinder.

* * * * *